United States Patent [19]
Wagner

[11] 3,831,048
[45] Aug. 20, 1974

[54] BEARING ASSEMBLY FOR POWER TOOLS

[75] Inventor: Robert W. Wagner, Easley, S.C.

[73] Assignee: The Singer Company, New York, N.Y.

[22] Filed: July 30, 1973

[21] Appl. No.: 384,164

[52] U.S. Cl. .............................................. 310/90
[51] Int. Cl. ............................................ H02k 5/20
[58] Field of Search ........................ 310/47, 50, 90

[56] References Cited
UNITED STATES PATENTS

| | | | |
|---|---|---|---|
| 3,051,373 | 8/1962 | Soumerai | 310/90 X |
| 3,080,106 | 3/1963 | Ayling | 310/90 X |

*Primary Examiner*—A. D. Pellinen
*Attorney, Agent, or Firm*—Marshall J. Breen; Chester A. Williams, Jr.; Harold Weinstein

[57] ABSTRACT

A bearing assembly for a power tool, such as a drill, having a housing formed of plastic in which a universal motor is mounted. The motor has an armature and a stator, with the armature shaft disposed axially in the housing and having a fan affixed thereto. Cooling apertures are formed in the housing in axially spaced relationship to each other on either side of the fan to permit ventilating air to enter and to exit the housing to cool the motor. A first bearing journals one end of the armature shaft in the housing. An improved second bearing is disposed in the path of ventilating air to journal the other end of the armature shaft. The improved bearing includes a bearing sleeve and a plurality of circumferentially spaced radial support members formed integrally with and extending from the bearing sleeve to seat and to support the second bearing within the housing. A plurality of axial apertures are formed in superposition to the bearing sleeve about the support members to permit the flow of ventilating air therethrough to cool the second bearing and the housing.

6 Claims, 3 Drawing Figures

PATENTED AUG 20 1974 3,831,048

BEARING ASSEMBLY FOR POWER TOOLS

BACKGROUND OF THE INVENTION

In the prior art the problem of heat dissipation has become critical in some instances for power tools, especially with the increased use of plastic housings. The general problems of heat dissipation are multiplied by the plastic housings which can cause over-heating in either the bearing or the housing. Also, the alignment of running parts such as the armature shaft can be disturbed by excessive heating resulting in either mechanical or electrical failure of the power tool. In attempts to overcome the problems the prior art has resorted to the use of bulky or multi-component heat sinks or heat isolators, and the use of the more expensive ball or needle bearings. In addition, the housing has become more complex through the required use of metal skelton frames within the plastic housing to hold the dimensional stability required of close tolerance rotational power components.

SUMMARY OF THE INVENTION

It is an object of the present invention to provide an improved bearing assembly for power tools which overcomes the prior art disadvantages; which is simple, economical and reliable; which uses a bearing assembly having concentric rings separated by a radial web; which uses a non-rotatively mounted bearing assembly; which uses a bearing assembly having an integrally formed bearing sleeve and support sleeve with intermediate ventilating apertures therein; which uses an improved bearing having ventilating apertures therein for mounting in a plastic housing; and which uses a bearing assembly having concentric sleeves for mounting in aligned recesses in a clam-shell housing in a non-rotative fashion.

Other objects and advantages will be apparent by the following description of one embodiment of the invention and the novel features will be particularly pointed out hereinafter in the claims.

BRIEF DESCRIPTION OF THE DRAWINGS

This invention is illustrated in the accompanying drawings in which.

DESCRIPTION OF THE INVENTION

Figure 1:
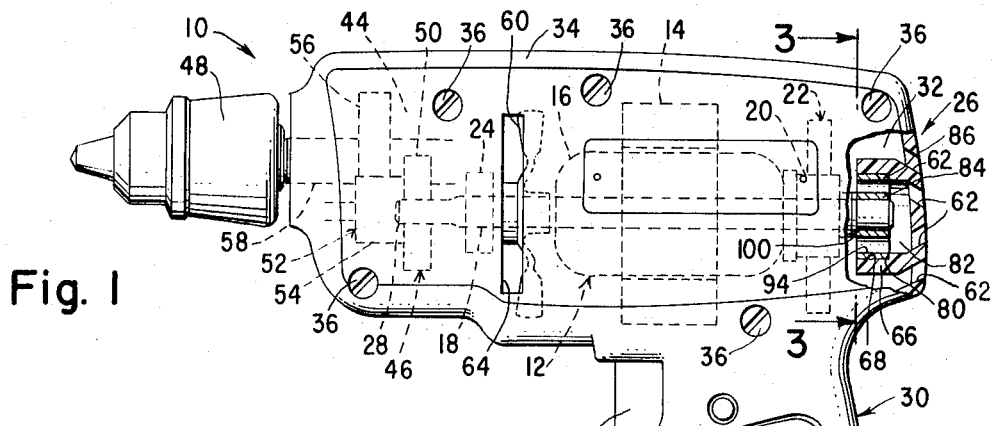
FIG. 1 is a side elevational view, partly in section, of a power tool, such as a portable drill, embodying the present invention.

A power tool, such as a portable power drill 10, is shown in FIG. 1 embodying the present invention. The drill 10 includes an electric universal motor 12 having a stator 14, an armature 16 and an armature shaft 18 which carries a commutator 20, engaged by a brush assembly 22. The armature shaft 18 is journaled adjacent its ends by axially spaced bearing assemblies 24 and 26, of which bearing assembly 26 defines the improved bearing of the present invention. A drive pinion 28 is formed at the forward end of the armature shaft 18. The universal motor 12 is mounted in a plastic housing 30 which in the preferred embodiment illustrated in FIG. 1 has a support portion 32 and a cover portion 34 suitably connected to each other as by screw means 36 so as to form what is commonly termed a clam-shell housing. The housing 30 has an integrally formed pistol-grip handle 38 which receives an electrical cord 40 that in turn is connected through a trigger switch 42 to the motor 12 in the usual manner.

A gear chamber 44 is formed in the front portion of the housing 30 and has a gear train 46 mounted therein to transmit the rotational movement from the motor 12 to a chuck 48 which is adapted to drive a suitable bit or implement that comes into engagement with the work. The gear train 46 is illustrated in FIG. 1 by dotted lines and serves the conventional function of (1) reducing the relative high rotational speed of the drive pinion 28, and (2) increasing the torque delivered to the chuck 48. The gear train 46 includes the pinion 28 which engages a larger gear 50 of a cluster gear 52, the smaller gear 54 of which engages a spindle gear 56 carried by the spindle 58, the projecting end of which has the chuck 48 affixed thereto.

A fan 60 shown in FIG. 1 is mounted on the armature shaft 18 intermediate the armature 16 and the front bearing 24. The housing 30 has a plurality of inlet apertures 62 and a pair of outlet apertures 64 formed in the support portion 32 and the cover portion 34, respectively. The fan has a draft side facing rearwardly so that air is drawn into the housing 30 through the inlet apertures 62 located at the rearward end of the housing 30 to cool the motor 12 before being discharged through the outlet apertures 64 formed slightly forwardly of the fan 60.

A pair of bearing bosses 66 are formed adjacent the inlet apertures 62 on the support portion 32 and the cover portion 34, respectively. A recess 68 is formed in the support portion boss 66 and a recess 70 is formed in the cover portion boss 66, which recesses 68 and 70 are mirror images of and in alignment with each other to form a circular opening 72 upon the support portion 32 and the cover portion 34 being mated to form the housing 30. Recess 68 has a circular side aperture 74 into which is disposed a resilient plug 76 shown in FIGS. 2 and 3. An axial slot 78 is formed in the recess 70 diametrically opposite the aperture 74. An annular shoulder 80, illustrated in FIGS. 1 and 2, in the circular opening 72 inwardly of the aperture 74 and the slot 78. A ventilating chamber 82 is formed inwardly of the annular shoulder 80 in communication with the intermediate inlet apertures 62.

Figure 2:
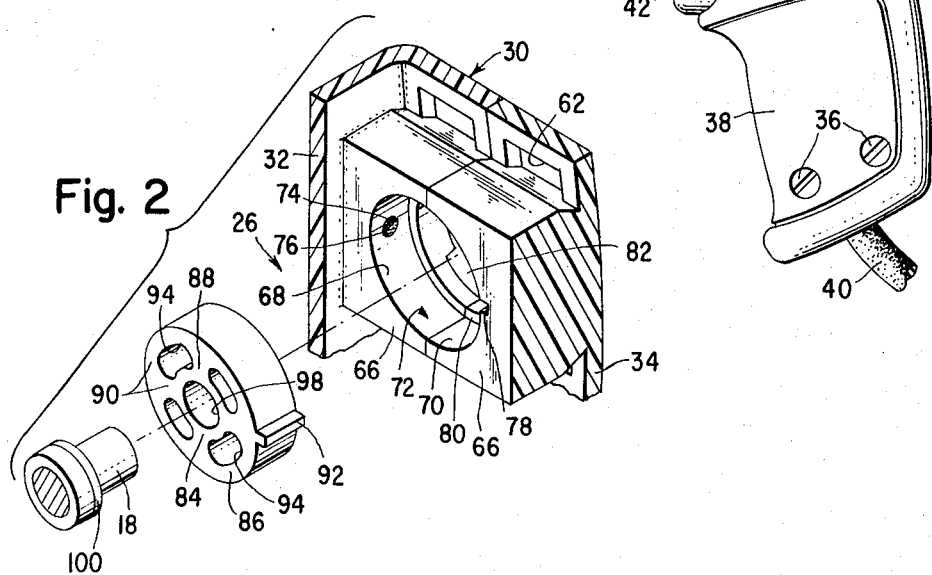
FIG. 2 is an exploded perspective view, partly in section, of the improved bearing assembly of the present invention.
Figure 3:
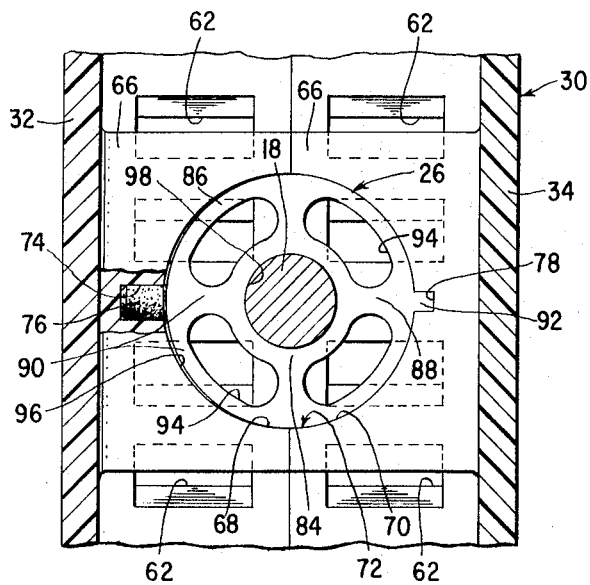
FIG. 3 is a front elevational view, partly in section, taken along line 3—3 of FIG. 1.

The improved bearing assembly 26 is depicted in FIGS. 1, 2 and 3 and includes a bearing sleeve 84 concentrically inwardly of a support sleeve 86, with the two sleeves being joined integrally by a plurality of radial webs 88. The support sleeve 86 and the radial webs 88 combine to define support members 90. An axial key or projection 92 is formed on the outer circumference of the support sleeve 86 and is sized to fit within the axial slot 78. A plurality of bearing apertures 94 are formed on either side of the radial webs 88 bounded by the bearing sleeve 84 and the support sleeve 86 for purposes more clearly explained hereinafter.

The bearing assembly 26 will be disposed within the circular opening 72 so as to place the key 92 within the axial slot 78 to render the bearing means 26 non-rotatable. The bearing means 26 will have its inner end engaging the annular shoulder 80, and the bearing apertures 94 will be in communication with the ventilating chamber 82. The resilient plug 76 will be slightly compressed and will urge the outer circumference of the support sleeve 86 in the direction of the slot 78 to provide for any manufacturing tolerances and to form a slight clearance space 96 within the recess 68 on either side of the resilient plug 76. This provides for a firm mounting support for the bearing means 26 and a positive axial alignment of the axis of the central opening 98 in which is journaled the end of the armature shaft 18 remote from the pinion 28. A spacer or thrust washer 100 will engage the forward face of the bearing means 26 adjacent the bearing sleeve 84 in the usual manner.

Upon operation of the drill 10 the motor 12 will be actuated to rotate the armature shaft 18 and the connected fan 60 to draw air in through all of the inlet apertures 62. The air drawn in through the intermediate inlet apertures 62 will enter the vent chamber 82 and be drawn through the bearing apertures 94 prior to passing through and cooling the motor 12 for subsequent discharge through the outlet aperture 64. The ventilating air passing through the bearing apertures 94 act to isolate the bearing sleeve 84 from the support sleeve 86 to prevent the direct heat transfer through the open space and also wash the exposed faces of the radial webs 88 to prevent excessive heat from being transmitted from the bearing sleeve 84 to the support sleeve 86. Thus, the support sleeve 86 which is the only member of the bearing assembly 26 which comes into direct contact with the plastic housing 30 remains relatively cool in comparison with the bearing sleeve 84 so as to prevent excessive heat build-up which would be harmful to the plastic housing 30. The improved bearing assembly 26 is mounted in the path of the cooling air so as to have its support sleeve remain at moderate temperatures and to act as a heat sink which in other constructions would require a much larger mass. Also, though the overall dimensions of the bearing assembly 26 are enlarged, the judicious use of the bearing apertures 94 permit an overall savings in material so as to make the bearing assembly 26 very economical. The bearing means 26 may be made of a non-magnetic metal such as a suitable bronze or brass, and may be formed by sintering, with or without the additional feature of oil impregnation.

It will be understood that various changes in the details, materials, arrangement of parts and operating conditions which have been herein described and illustrated in order to explain the nature of the invention may be made by those skilled in the art within the principles and scope of the invention.

Having thus set forth the nature of the invention, what is claimed herein is:

1. A bearing assembly for a power tool comprising:
   a. a housing formed of plastic,
   b. a motor having a stator and an armature mounted in the housing,
   c. a shaft for the armature disposed axially in the housing and having a fan affixed thereto,
   d. apertures formed in the housing in axially spaced relationship on either side of the fan to permit ventilating air to enter and to exit the housing to cool the motor,
   e. a first bearing means connected in the housing to journal one end of the armature shaft, and
   f. a second bearing means disposed in the path of ventilating air, and including a bearing sleeve to journal the other end of the armature shaft, and a plurality of circumferentially spaced radial support members integrally formed with and extending from the bearing sleeve to center and to seat the second bearing means within the housing and to form a plurality of axial apertures through which ventilating air will flow to cool both the second bearing means and the housing.

2. The combination claimed in claim 1 wherein:
   a. the support members of the second bearing means include a support sleeve spaced radially outwardly of the bearing sleeve, and a plurality of radial webs interconnecting the bearing sleeve and the support sleeve with a plurality of apertures formed to be bounded by the bearing sleeve, the support sleeve, and the radial webs,
   b. a recess formed in the housing, and
   c. the support sleeve mounted in the recess of the housing.

3. The combination claimed in claim 2 wherein:
   a. the plurality of apertures are formed in an arcuate shape to define an annular space interrupted by the radial webs.

4. The combination claimed in claim 1 wherein:
   a. means associated with the support members and the housing to render the second bearing means non-rotatively mounted in said housing.

5. The combination claimed in claim 4 wherein:
   a. the housing has a support portion and a cover portion to define a clam-shell structure,
   b. a pair of aligned recesses formed in the support portion and the cover portion of the housing,
   c. an axial slot formed in one of the recesses, and
   d. an axial projection formed on one of the support members for engagement in the axial slot of the recess to render the second bearing means nonrotatively mounted in the housing.

6. A one-piece bearing and support member for a housing of a power tool in which is mounted a universal motor of the stator armature type with a rotatable armature shaft journaled by a pair of axially spaced bearings, one of which is said bearing and support member which comprises:
   a. a pair of sleeve members radially spaced from each other,
   b. a bearing sleeve is defined by the inner sleeve,
   c. a support sleeve is defined by the outer sleeve,
   d. a plurality of radially extending webs interconnect the bearing sleeve and the support sleeve, and
   e. means formed on the support sleeve to engage the housing and render the bearing and support member non-rotative.

\* \* \* \* \*